UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLINE COMPOUND.

SPECIFICATION forming part of Letters Patent No. 552,209, dated December 31, 1895.

Application filed June 12, 1895. Serial No. 552,582. (No specimens.)

*To all whom it may concern:*

Be it known that I, JOHN H. STEVENS, of the city of Newark, county of Essex, and State of New Jersey, have invented certain new and useful Improvements in the Manufacture of Compounds of Pyroxyline, of which the following is a specification.

The specific compounds to which the present invention is confined are intended as imitations of natural substances, and the invention is especially designed to furnish the operator in this art with a means for obtaining compounds possessing plasticity, or compounds which are valuable or useful by reason of their susceptibility to molding treatment under heat and pressure. As to the state of the art and the difficulties connected with the discovery and application of substances which impart to pyroxyline compounds this quality of plasticity, I refer to my United States Patent No. 517,987, dated April 10, 1894.

In making the pyroxyline compounds of the present class, it is necessary to employ solvent substances in order to convert, or dissolve, the pyroxyline as is well understood. The solvents consist of liquids and solids, methyl-alcohol being a good instance of a liquid solvent, and gum-camphor representing a solid solvent.

When suitable combinations of both classes of solvents are made and applied in dissolving or converting the pyroxyline to plastic masses or solutions, and the exposure of the mixture to evaporating influences leaves it in the final hard condition, the liquid solvent evaporates almost entirely, leaving the solid solvent in intimate combination with the pyroxyline. On heating the final compound the solid solvent melts, or fuses, and softens the pyroxyline so that the mass is plastic, and as the most important compounds in use are manipulated at some stage of their manufacture by means of heat and pressure (either in masticating rolls, or dies, or when shaped in hot water) the controlling of this plastic property by means of proportions or peculiar properties belonging to the solid solvents renders the discovery of new solid solvents, either simple or compound, of extreme importance.

Notwithstanding the many solid solvents already known, many of which are of my own discovery, the necessities of the art demand a great variety suited to the different applications for which the pyroxyline compounds are intended.

It is the object of the present invention to increase the number of solid substances which can be usefully employed with pyroxyline in the present class of compounds to impart the plastic property, and I have discovered that paranitrotoluol, a substance well-known to chemistry, is, when melted by means of heat, a solvent of pyroxyline. While not a solvent of great power, it is nevertheless effective in combination with pyroxyline as an agent for imparting plasticity to the compound, but I regard as the most important part of the present invention the application of paranitrotoluol as an agent in conjunction with other solid solvents for regulating or improving their action.

Notwithstanding the discovery of new solvents, the older ones, such as camphor, will always be of practical use. There are some difficulties, however, connected with the employment of camphor, mainly due to its high melting-point, which need correction. I have discovered that, by making suitable combinations of paranitrotoluol and such solid solvents as camphor and acetanilid, compound solid solvents are produced which produce entirely new results in these plastic compounds. When used with camphor, especially, I have discovered that paranitrotoluol has a most remarkable action in pyroxyline compounds, enabling the camphor to form solid dry compounds extremely susceptible to such low temperatures that no knowledge based on the properties of camphor, paranitrotoluol and pyroxyline separately would enable the operator to predict the qualities in the camphor-paranitrotoluol-pyroxyline combinations. In order to properly instruct the operator in using this new solvent in this class of compounds, I would state that I have found that paranitrotoluol is sparingly soluble in wood-spirit and ordinary alcohol, fairly soluble in amyl-acetate, and that it is easily soluble in acetone.

The solubility of paranitrotoluol in the solvents mentioned I find to be about as follows: six and one-half parts alcohol, three and one-fourth parts wood-spirit, two parts amyl-acetate, and one-half part acetone. These proportions are only approximate and were ascertained at the ordinary temperature of the atmosphere in the work-room. In admixture with camphor its solubility, however, is remarkably increased, so that equal parts of camphor and paranitrotoluol by weight are soluble in practically all proportions of either alcohol, wood-spirit, amyl-acetate, or acetone. Again, equal parts of paranitrotoluol and acetanilid form a mixture soluble in about two parts alcohol, one and one-fourth parts wood-spirit, three parts amyl-acetate, or one and one-fourth parts acetone; but it will be observed that the acetanilid has less power to increase the solubility of the paranitrotoluol than is possessed by the camphor.

The operator will notice that the paranitrotoluol is soluble to a remarkable degree in acetone. Hence he will find that acetone is an extremely valuable liquid menstruum for this new solid solvent.

When the paranitrotoluol is used alone as the solid solvent, I prefer to employ acetone as the liquid menstruum in making the various mixtures in this class of compounds. Where the paranitrotoluol is used to improve the action of camphor, I find that I can use any of the liquid solvents mentioned, although I prefer wood-alcohol. A solution of equal parts of camphor and paranitrotoluol in alcohol is an active solvent of pyroxyline, notwithstanding the non-solvent character of the alcohol. The other liquid solvents mentioned also form active solvents with the camphor mixture.

With paranitrotoluol and acetanilid mixtures I prefer to employ acetone, though other active liquid solvents are effective. As to proportions, I find that where the paranitrotoluol is used alone as the solid solvent, one to two parts of it to each four parts of pyroxyline are sufficient, the larger proportions giving the greater plasticity. When the mixture of paranitrotoluol and camphor is used as the solvent I employ about one part of a mixture of equal parts of each to two parts of the pyroxyline. This gives a compound which, when dry, is extremely plastic and possesses different properties from the ordinary camphor compounds, as it is capable of being manipulated in hot water.

Another useful mixture is one part acetanilid, one part paranitrotoluol, and four parts pyroxyline. This is also an extremely plastic material. Useful combinations can also be formed by adding the paranitrotoluol to a mixture of camphor and acetanilid, in which case all of the liquids are more or less effective. The total proportion of the mixed solid solvent thus formed should be about the same to the pyroxyline as the proportions already recommended for other combinations. Of course, it is understood that the liquid solvents or menstrua are used to effect an intimate combination of the solid solvent and pyroxyline and aid in transforming the ingredients into a solid homogeneous mass with the assistance of well-known mechanical operations involving the use of pressure, or heat and pressure. The present invention is also useful in combination with my dinitrobenzene and dinitrotoluol compounds.

The solid solvents of the present application are of such a nature that when they are employed with the proper liquid menstruum or liquid menstrua as recommended they are useful both in liquid solutions and in stiffer masses. By maintaining the proportions of pyroxyline and solid solvent as given the compound can be rendered fluid by the addition of sufficient solvent of the proper character, so that a solution is formed which can be evaporated down to films or thin sheets, or used as a protective coating. The products of the liquid process will also be plastic under heat, the same as those made by using the process involving the economical use of solvent aided by mechanical manipulations.

Any of the known methods can be employed; but in all cases the heating of these compounds, especially when they are in such a condition that the liquid solvent present is insufficient to impart plasticity, is an employment of the solvent property of the paranitrotoluol, either alone, or in combination with the other solids mentioned as the solvent of the pyroxyline, when brought into activity by means of heat or heat and pressure. The proportions of solid solvent can also be varied at will.

I am aware that nitrobenzol and other nitro compounds have been employed as solvents of pyroxyline, but I believe that I am the first to discover the useful solvent powers of paranitrotoluol in the present class of compounds, and also claim as original with me the process which involves intimately mixing paranitrotoluol alone, or in the combinations mentioned, with pyroxyline and then effecting the conversion, as well as subsequently effecting a change of the shape of the compound by means of heat and pressure.

The operator will appreciate the difficulties involved in ascertaining the conditions under which the paranitrotoluol and its combinations with other solid solvents have been found to work, for it is well known that in making the present class of compounds the simple discovery of the fact that the substance is a solvent of pyroxyline does not indicate its usefulness.

It is obvious that the experience with nitro compounds in explosives and other pyroxyline combinations has been insufficient to give the operator the novel information contained in this specification.

Having thus described the nature and objects of my improvements, what I herein claim as new, and desire to secure by Letters Patent, is—

1. The method of forming compounds of pyroxyline which consists in intimately mixing paranitrotoluol and pyroxyline and then subjecting the mixture to heat and pressure, substantially as set forth.

2. The method for the production of compounds of pyroxyline which consists in intimately mixing paranitrotoluol with pyroxyline and a solid solvent, or solid solvents, of the same, and then subjecting such mixture to heat and pressure, substantially as set forth.

3. The method for the production of compounds of pyroxyline which consists in mixing paranitrotoluol with other known solvents of pyroxyline, and then subjecting such mixture to heat and pressure, substantially as set forth.

4. As a new composition of matter a pyroxyline compound containing paranitrotoluol and pyroxyline, substantially as described.

5. As a new composition of matter, a compound of pyroxyline consisting of paranitrotoluol associated with another solid solvent, or solid solvents, and pyroxyline, substantially as described.

6. As a new composition of matter, a compound of pyroxyline containing paranitrotoluol associated with other known solvents of pyroxyline, substantially as set forth.

In witness whereof I have hereunto signed my name this 8th day of June, 1895.

JOHN H. STEVENS.

In presence of—
ALFRED F. STEVENS,
WILL C. HEADLEY.